United States Patent
Rubio et al.

(10) Patent No.: US 12,364,360 B2
(45) Date of Patent: *Jul. 22, 2025

(54) INDUCTION HEATABLE COATED METAL COOKING SURFACE

(71) Applicant: SEB S.A., Ecully (FR)

(72) Inventors: Martin Rubio, Rumilly (FR); Jean-Francois Brasset, Annecy (FR)

(73) Assignee: SEB S.A., Ecully (FR)

( * ) Notice: Subject to any disclaimer, the term of this patent is extended or adjusted under 35 U.S.C. 154(b) by 63 days.

This patent is subject to a terminal disclaimer.

(21) Appl. No.: 17/789,389

(22) PCT Filed: Dec. 22, 2020

(86) PCT No.: PCT/EP2020/087711
§ 371 (c)(1),
(2) Date: Jun. 27, 2022

(87) PCT Pub. No.: WO2021/130277
PCT Pub. Date: Jul. 1, 2021

(65) Prior Publication Data
US 2023/0050619 A1 Feb. 16, 2023

(30) Foreign Application Priority Data
Dec. 27, 2019 (FR) ...................... 1915686

(51) Int. Cl.
*A47J 36/02* (2006.01)
*A47J 27/00* (2006.01)
(Continued)

(52) U.S. Cl.
CPC ........... *A47J 36/025* (2013.01); *A47J 27/002* (2013.01); *B21D 51/22* (2013.01); *B32B 15/012* (2013.01); *C23C 2/12* (2013.01)

(58) Field of Classification Search
None
See application file for complete search history.

(56) References Cited

U.S. PATENT DOCUMENTS

| | | | |
|---|---|---|---|
| 10,258,192 B1 * | 4/2019 | Cloutier | A47J 36/16 |
| 2015/0083711 A1 * | 3/2015 | Moon | A47J 36/02 |
| | | | 29/602.1 |
| 2019/0381764 A1 * | 12/2019 | Kang | C23C 2/16 |

FOREIGN PATENT DOCUMENTS

| CN | 103462513 A | * 12/2013 |
|---|---|---|
| CN | 205493578 U | * 8/2016 |

(Continued)

OTHER PUBLICATIONS

Reliance Foundry, "Is Carbon Steel Better than Mild Steel?", <https://www.reliance-foundry.com/blog/carbon-steel-mild-steel>, accessed Nov. 1, 2023.*

(Continued)

*Primary Examiner* — Xiaobei Wang
(74) *Attorney, Agent, or Firm* — Lerner David LLP

(57) ABSTRACT

The invention relates to a coated metal cooking rack compatible with induction healing, comprising a metal body including a heating face bearing a protective coating and a cooking face bearing an anti-adhesive coating forming a cooking surface.

Figure 1:
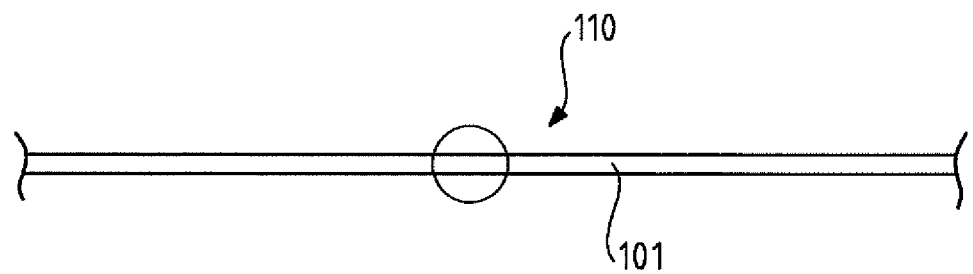

According to the invention, the metal body is made of two-sided aluminized ferromagnetic low-carbon steel sheet comprising a ferromagnetic low-carbon steel substrate having on each of its two faces an outer layer comprising an aluminum-based matrix, an intermediate layer comprising iron/aluminum intermetallic compounds being arranged between the ferromagnetic low-carbon steel substrate and the outer layer, and at least on the bottom of the heating face the outer layer has a thickness of less than 27 μm, preferably less than 20 μm, and even more preferably less than 18 μm.

(Continued)

The invention also relates to a culinary article, an electric cooking appliance and a method of obtaining a coated metal cooking rack.

21 Claims, 4 Drawing Sheets

(51) Int. Cl.
  *B21D 51/22* (2006.01)
  *B32B 15/01* (2006.01)
  *C23C 2/12* (2006.01)

(56) References Cited

FOREIGN PATENT DOCUMENTS

| CN | 109097717 A | * | 12/2018 | ............ A47J 27/002 |
|---|---|---|---|---|
| EP | 2554080 A1 | | 2/2013 | |
| FR | 3070245 A1 | | 3/2019 | |
| KR | 102031902 B1 | * | 10/2019 | |
| WO | 2011073577 A2 | | 6/2011 | |
| WO | WO-2018117716 A1 | * | 6/2018 | ............ B32B 15/012 |
| WO | WO-2019038498 A1 | * | 2/2019 | .............. A47J 36/02 |

OTHER PUBLICATIONS

Lemmens et al., "Effect of silicon on the microstructure and growth kinetics of intermetallic phases formed during hot-dip aluminizing of ferritic steel", Mar. 19, 2017, Surface & Coatings Tech., 319, pp. 104-109. (Year: 2017).*

Gupta, "Internetallic compound formation in Fe—Al—Si ternary system: Part I", 2003, Materials Characterization, 49, pp. 269-291. (Year: 2003).*

Gupta, "Internetallic compound formation in Fe—Al—Si ternary system: Part II", 2003, Materials Characterization, 49, pp. 293-311. (Year: 2003).*

International Search Report for Application No. PCT/EP2020/087711 mailed Feb. 1, 2021, 2 pages.

* cited by examiner

INDUCTION HEATABLE COATED METAL COOKING SURFACE

CROSS-REFERENCE TO RELATED APPLICATIONS

The present application is a national phase entry under 35 U.S.C § 371 of International Application No. PCT/EP2020/087711 filed Dec. 22, 2020, which claims priority from French Application No. 1915686 filed Dec. 27, 2019, all of which are hereby incorporated herein by reference.

The present invention relates to the technical field of metal cooking racks compatible with induction heating, for cooking or reheating food. Such metal cooking racks can be used with an induction heating device such as an induction hob installed or integrated into a worktop, or an induction heater integrated into an electric cooking appliance.

The present invention relates more particularly to coated metal cooking racks compatible with induction heating.

The present invention relates particularly, but not exclusively, to coated metal cooking racks forming a cooking vessel.

The present invention also relates to cookware comprising a coated metal cooking support associated with at least one gripping element. If desired, the gripper(s) can be removed or disassembled from the coated metal firing support.

The present invention also relates to electric cooking appliances having a coated metal cooking support associated with an induction heater.

It is known from EP2554080 to make a coated cookware compatible with induction heating, wherein a metal plate forming a cooking surface is joined with a ferritic stainless steel plate using an intervening aluminum plate to obtain a metallurgical joining of the different plates.

A disadvantage of this type of design is that such a coated metal cooking vessel has a relatively high cost price, due in particular to the presence of a stamping operation to obtain a metallurgical assembly of the various plates.

Another disadvantage of this design is that such a coated metal cooking vessel is relatively heavy, due to the presence of the interleaved aluminum plate and the ferritic stainless steel plate.

Various aspects of the present invention are intended to overcome the disadvantages of the prior art by providing a coated metal cooking surface that is compatible with induction heating and has a limited cost.

A first aspect of the present invention relates to a coated metal cooking medium compatible with induction heating, comprising a metal body including a heating face and a cooking face, the heating face having a bottom configured to rest on an induction heating device, the heating face carrying a protective coating, the cooking face carrying an anti-adhesive coating forming a cooking surface in that the metal body is made of two-sided aluminized low-carbon ferromagnetic steel sheet comprising a low-carbon ferromagnetic steel substrate having on each of its two faces an outer layer comprising an aluminum-based matrix that an intermediate layer comprising iron/aluminum intermetallic compounds is arranged between the ferromagnetic low-carbon steel substrate and the outer layer, and that at least on the bottom of the heating face the outer layer has a thickness of less than 27 µm, preferably less than 20 µm, and even more preferably less than 18 µm. The low-carbon steel used for the ferromagnetic substrate is sensitive to magnetic field and can be heated by induction. Aluminum, on the other hand, is a disturbing material for the magnetic field used for induction heating. However, during the aluminization of a steel sheet, an intermetallic reaction layer is formed at the interface between the steel and the aluminum. The intermetallic compounds of the intermediate layer do not have the disruptive character of aluminum for the magnetic field used for induction heating. Thus, in the aluminum-based coating used for aluminization, the thickness of the outer layer comprising an aluminum-based matrix appears to be the main relevant parameter for obtaining compatibility with induction plates. The use of such a coated metal body provides a coated metal cooktop that is compatible with induction heating and is more economical to produce than a coated metal cooktop comprising an aluminum body combined with a ferromagnetic steel element. The use of such a coated metal body provides a coated metal cooktop compatible with induction heating that is lighter than a coated metal cooktop made from cast steel.

The outer layer may comprise Al—Fe—Si needles in an aluminum-silicon matrix. The use of an aluminizing bath containing aluminum and silicon facilitates the production of the outer layer during the aluminization of the steel sheet. Silicon does not have the disruptive character of aluminum for the magnetic field used for induction heating.

The ferromagnetic low-carbon steel substrate can have a thickness of between 0.7 and 3 mm, and preferably a thickness of between 1 and 2 mm.

The ferromagnetic low-carbon steel substrate can be made of a steel grade with at most 0.3 wt. % carbon, and preferably between 0.1 and 0.2 wt. % carbon.

The protective coating can be applied directly to the heating surface of the metal body. The protective coating may consist of one or more layers.

The anti-adhesive coating can be applied directly to the cooking side of the metal body. The anti-adhesive coating may have one or more layers. If desired, an intermediate coating can be arranged between the anti-adhesive coating and the metal body, to obtain a hard base.

The protective coating can be a PTFE type coating, or an enamel type coating, or a lacquer type coating, or a ceramic type coating, or a sol-gel type coating.

According to an embodiment, the protective coating can be a PTFE type coating, or a lacquer type coating, or a ceramic type coating, or a sol-gel type coating, the metal body comprising an aluminum based deposit having at least on the bottom of the heating face a thickness of less than 30 µm, and preferably a thickness less than 20 µm.

According to another embodiment, the protective coating can be an enamel-type coating, the metal body comprising an aluminum-based deposit having at least on the bottom of the heating face a thickness of less than 40 µm, and preferably a thickness of less than 30 µm.

The anti-adhesive coating can be a PTFE type coating, or a ceramic type coating, or a sol-gel type coating.

The coated metal cooking rack may have a side wall rising around the bottom of the heating face to form a cooking vessel.

In particular, the coated metal baking tray may have a pinched edge or a rolled edge or an open rolled edge. This arrangement avoids leaving the edge of the metal body visible.

A second aspect of the present invention relates to a culinary article comprising a coated metal cooking support and a gripper mounted on the coated metal cooking support, in that the coated metal cooking support conforms to at least one of the above features.

A third aspect of the present invention relates to an electric cooking appliance having a coated metal cooking surface associated with an induction heater, in that the coated metal cooking surface conforms to at least one of the foregoing features.

A fourth aspect of the present invention relates to a method of obtaining a coated metal cooking medium compatible with induction heating according to at least one of the above features, comprising the following steps:

Cutting or supplying a shape from a two-sided aluminized low carbon ferromagnetic steel sheet, Stamping of the form to form the metal body comprising the heating face and the cooking face, Making the protective coating on the heating face, Making the anti-adhesive coating on the cooking face to form the cooking surface.

After drawing the form and before the protective and anti-adhesive coatings are applied, the process may include a step of treating a peripheral portion of the form to obtain a pinched edge or a rolled edge or an open rolled edge.

The protective coating can be a PTFE type coating, or an enamel type coating, or a lacquer type coating, or a ceramic type coating, or a sol-gel type coating.

The anti-adhesive coating can be a PTFE type coating, or a ceramic type coating, or a sol-gel type coating.

A fifth aspect of the present invention relates to a method of obtaining a coated metal cooking medium compatible with induction heating according to at least one of the above features, comprising the following steps:

Cutting or supplying a shape from a two-sided aluminized low carbon ferromagnetic steel sheet comprising a first side and a second side, Protective coating on the first side and anti-adhesive coating on the second side to obtain a coated shape, Stamping the coated form to form the coated metal body comprising the heating side carrying the protective coating and the cooking side carrying the anti-adhesive coating to form the cooking surface.

After the protective coating and the anti-adhesive coating have been applied and after the coated form has been drawn, the process may include a step of treating a peripheral portion of the coated form to obtain a pinched edge or a rolled edge or an open rolled edge.

The protective coating can be a PTFE-type coating or a lacquer-type coating.

The anti-adhesive coating can be a PTFE-type coating.

According to one embodiment, the shape may be a disk. However, other shapes are possible.

Figure 2:
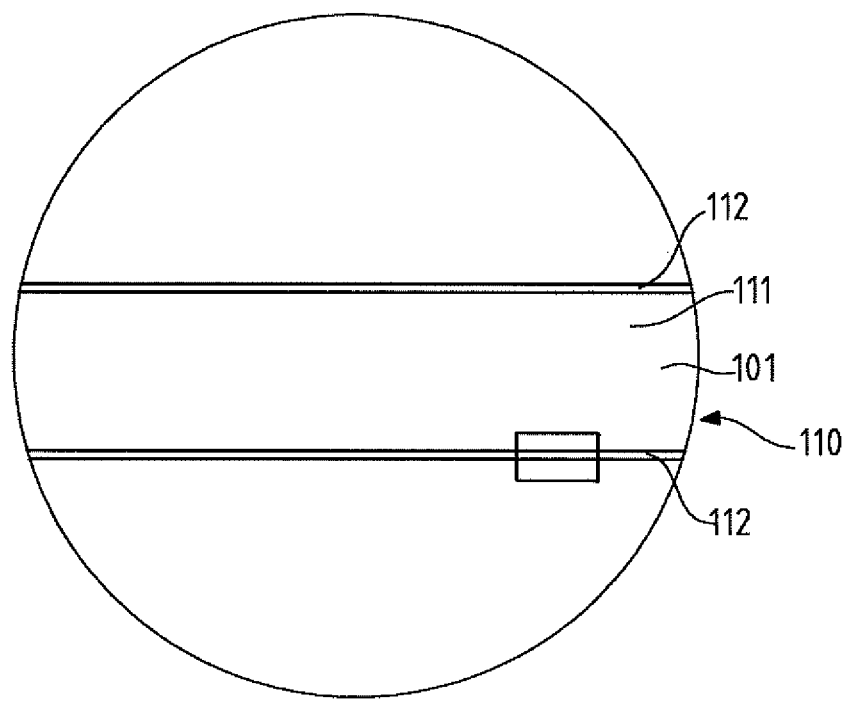
Figure 3:
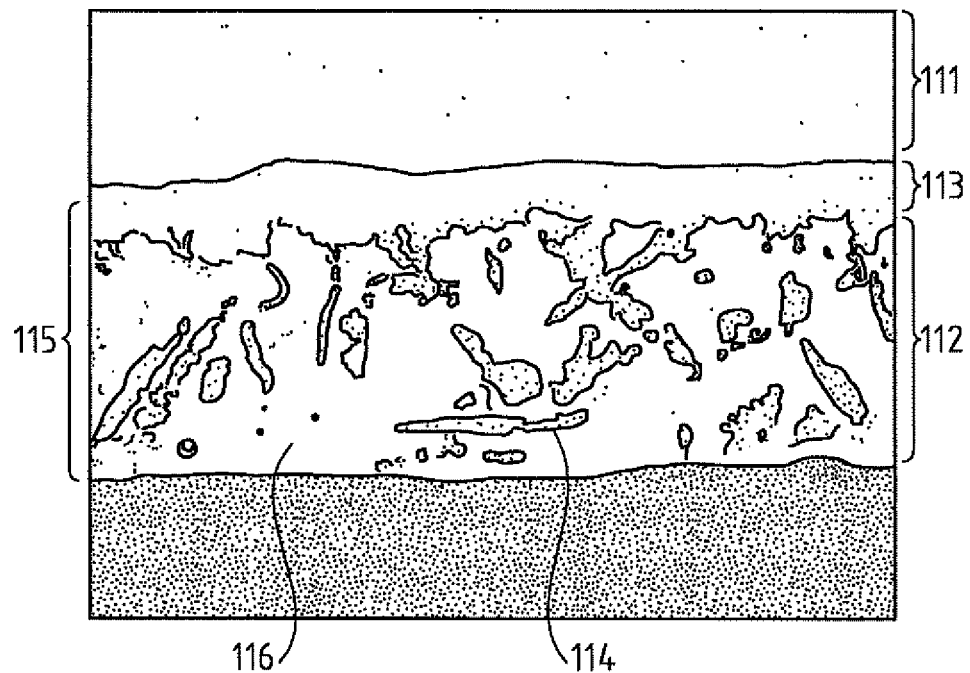
Figure 4:
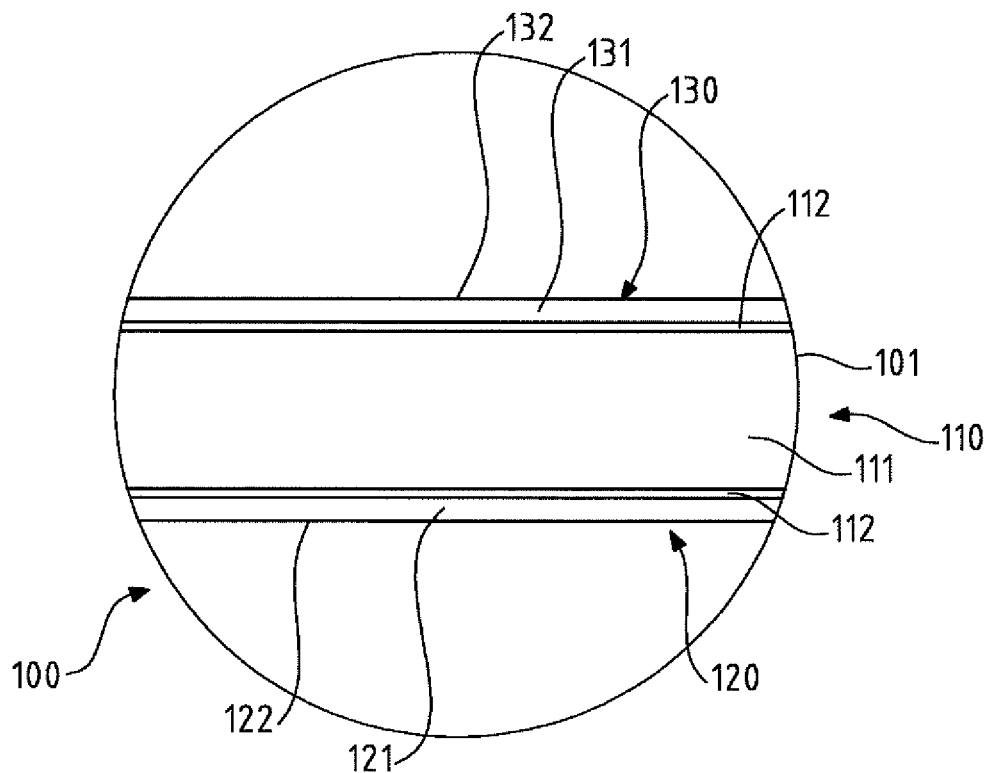
Figure 5:
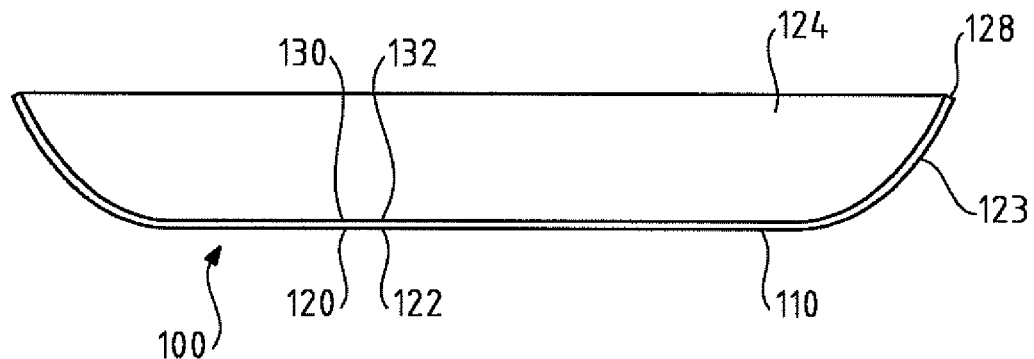
Figure 6:
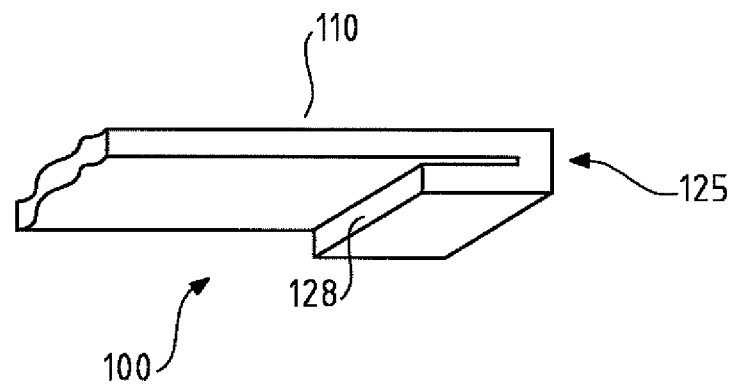
Figure 7:
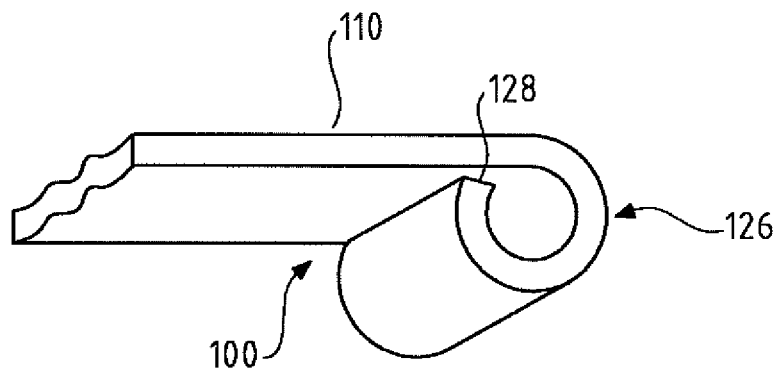
Figure 8:
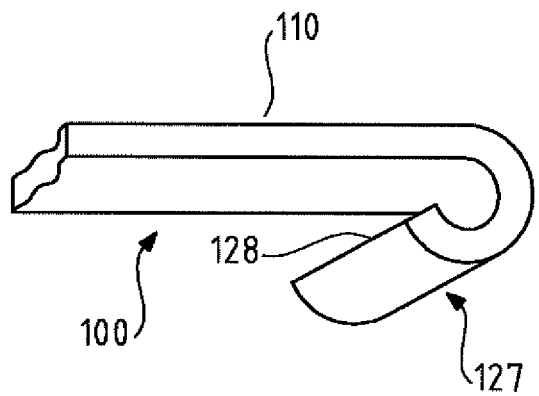
Figure 9:
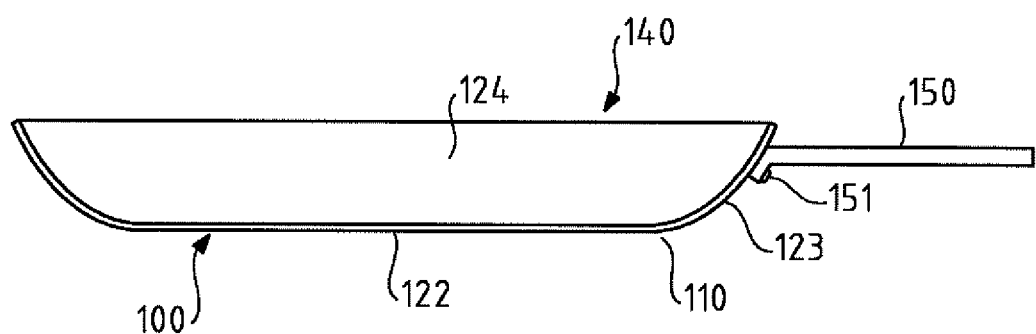
Figure 10:
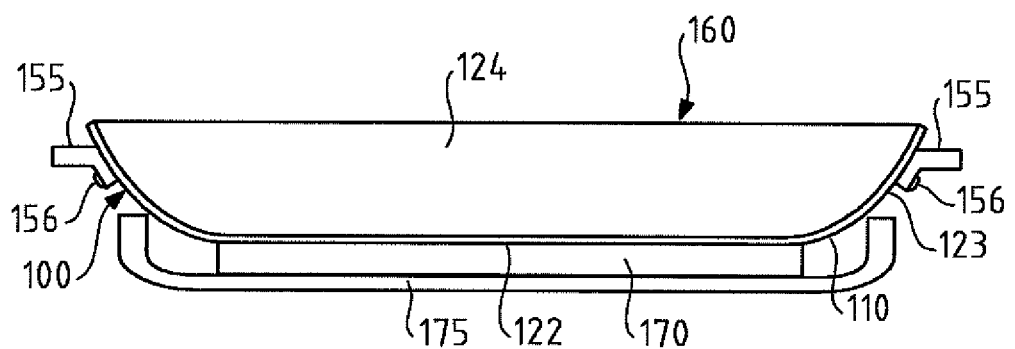

Other features and attributes of the present invention will become more apparent from the following detailed description of exemplary embodiments and variants, taken by way of non-limitation, illustrated in the appended figures, wherein:

FIG. 1 represents a partial schematic view of an example of an embodiment of a metal body used to make a coated metal cooking support according to the invention, FIG. 2 shows an enlarged schematic sectional view of the metal body shown in FIG. 1, FIG. 3 shows an enlarged sectional view of a superficial part of the metal body shown in FIG. 2, FIG. 4 shows an enlarged schematic cross-section of the metal body shown in FIG. 1, after a protective coating and an anti-adhesive coating have been applied, FIG. 5 shows a schematic cross-sectional view of an example of an embodiment of a coated metal baking rack according to the invention comprising the metal body shown in FIG. 1, FIG. 6 shows a schematic cross-sectional view of a first embodiment of a peripheral portion of a coated metal baking tray according to the invention, having a pinched edge, FIG. 7 shows a schematic cross-sectional view of a second embodiment of a peripheral portion of a coated metal baking rack according to the invention, having a rolled edge, FIG. 8 shows a schematic cross-sectional view of a third embodiment of a peripheral portion of a coated metal baking rack according to the invention, having an open rolled edge, FIG. 9 shows a schematic elevation and vertical cross-sectional view of an example embodiment of a cookware article having a coated metal cooking rack according to the invention, FIG. 10 shows a schematic elevation and vertical cross-sectional view of an example embodiment of an electric cooking appliance having a coated metal cooking rack according to the invention.

FIG. 1 illustrates an example embodiment of a metal body 110 used to make a coated metal cooking rack 100 compatible with induction heating, shown in FIG. 5.

The metal body 110 is made of double-sided aluminized low-carbon ferromagnetic steel sheet 101. The double-sided aluminization of a low-carbon ferromagnetic steel sheet is achieved by immersion in an aluminum-based aluminizing bath to achieve an aluminum-based 115 deposit. The aluminum-based bath may include silicon, in particular between 8 and 13% by weight of silicon, to facilitate deposition on the steel. In particular, an AS-type aluminum-silicon alloy can be used, for example an AS alloy with between 8 and 13% silicon by weight. However, the use of an aluminizing bath with lower proportions of silicon, or an aluminizing bath without silicon, can be considered. The amount of material deposited on the low carbon ferromagnetic steel sheet can be evaluated by weighing. The additional mass thus obtained makes it possible to define a thickness for the aluminum-based deposit 115 on the steel sheet. Usually such an aluminum-based deposit 115 can reach several tens of µm.

As shown in FIG. 2, the two-sided aluminized low-carbon ferromagnetic steel sheet 101 used to make the coated metal induction heating-compatible cooking medium 100 comprises a low-carbon ferromagnetic steel substrate 111 having an aluminum-based outer layer 112 on each of its two sides.

The ferromagnetic low-carbon steel substrate 111 may have a thickness of between 0.7 and 3 mm, particularly a thickness of between 1 and 2 mm. The material of the ferromagnetic low-carbon steel substrate 111 is chosen to be compatible with induction heating. The ferromagnetic low-carbon steel substrate 111 may be made of a steel grade having at most 0.3 mass % carbon, and preferably between 0.1 and 0.2 mass % carbon. The ferromagnetic substrate made of low-carbon steel 111 can in particular be made of a grade DX51 to DX56 comprising between 0.12% and 0.18% by mass of carbon and up to 0.5% by mass of silicon.

As best seen in FIG. 3, an intermediate layer 113 is arranged between the ferromagnetic low-carbon steel substrate 111 and the outer layer 112. The intermediate layer 113 is an intermetallic reaction layer comprising iron/aluminum intermetallic compounds, in particular $FeAl_3$ and $Fe_2Al_5$. Thus, all of the aluminum-based deposit 115 made on the sheet steel is not found in the outer layer 112. A portion of the aluminum-based deposit 115 is in the intermediate layer 113.

The thickness of this intermediate layer 113 is usually between 3 and 5 µm. However, heat treatments above 500° C. can contribute to increase the thickness of this intermediate layer 113 to the detriment of the thickness of the external layer 112, this intermediate layer 113 can then be subdivided into several sub-layers having different aluminum/iron ratios, these ratios increasing from the ferromagnetic substrate made of low carbon steel 111 towards the external layer 112.

The aluminum-based outer layer 112 may include silicon, when the aluminizing bath includes silicon, particularly between 8 and 13% by weight of silicon. The outer layer 112 may then include Al—Fe—Si needles 114 in an aluminum-silicon matrix 116, as seen in the example embodiment shown in FIG. 4.

As shown in FIG. 5, the metal body 110 includes a heating face 120 and a firing face 130. The heating side 120 has a bottom 122 configured to rest on an induction heating device, including an induction plate or induction heater.

As shown in FIG. 4, the heating face 120 bears a protective coating 121; the cooking face 130 bears an anti-adhesive coating 131 forming a cooking surface 132.

The coated metal cooking rack 100 compatible with induction heating according to the invention shown in FIG. 4 includes metal body 110, protective coating 121, and anti-adhesive coating 131. The metal body 110 has the protective coating 121 and the anti-adhesive coating 131.

The heating side 120 and the cooking side 130 are formed by the two-sided aluminized low carbon ferromagnetic steel sheet 101.

If desired, the protective coating 121 can be applied directly to the heating surface 120 of the metal body 110, in particular to the outer layer 112 on the bottom side 122. If necessary, a surface preparation can be carried out on the heating surface 120 before the protective coating 121 is made. In particular, the protective coating 121 may be a PTFE-type coating, or an enamel-type coating, or a lacquer-type coating, or a ceramic-type coating, or a sol-gel-type coating.

If desired, the anti-adhesive coating 131 can be made directly on the cooking face 130 of the metal body 110, in particular on the external layer 112 opposite the bottom 122. If necessary, a surface preparation can be carried out on the cooking side 130 before the protective coating 121 is made. In particular, the anti-adhesive coating 131 may be a PTFE type coating, or a ceramic type coating, or a sol-gel type coating.

As shown in FIG. 5, the coated metal cooking rack 100 may include a sidewall 123 rising around the bottom 122 of the heating face 120 to form a cooking vessel 124. Alternatively, the coated metal cooking rack 100 does not necessarily form a cooking vessel 124. In particular, the coated metal cooking surface 100 can form a cooking plate.

Tests with several induction plates have shown that the relevant parameter for achieving compatibility with induction heating on different induction heating devices is the thickness of the outer layer 112 on the bottom 122 of the heating face 120, not the thickness of the aluminum-based deposit 115 on the bottom 122 of the heating face 120. The induction plates used are described in Table 1.

TABLE 1

|  | MIELE ® | THOR ® | BRANDT ® |
|---|---|---|---|
| Ref | KM5946 | TTI63R | TI312 BT1 |
| Power | 3000 W | 2300 W | 2000 W |
| Ø inducer | 260 mm | 220 mm | 210 mm |

Indeed, these tests have shown that the limit value of the thickness of the aluminum-based deposit 115 on the bottom 122 of the heating face 120 to obtain a coupling on an induction plate is of the order of 30 μm when the protective coating 121 is a PTFE-type coating, or a lacquer-type coating or a ceramic-type coating, or a sol-gel-type coating, but that the limit value of the thickness of the aluminum-based deposit 115 on the bottom 122 of the heating face 120 to obtain coupling on an induction plate is of the order of 40 μm when the protective coating 121 is an enamel-type coating. These tests also showed that a satisfactory coupling was obtained with all the induction plates below a thickness of aluminum-based deposit 115 on the bottom 122 of the heating face 120 of the order of 20 μm, when the protective coating 121 is a PTFE-type coating, or a lacquer-type coating, or a ceramic-type coating, or a sol-gel-type coating; and below an aluminum-based deposit thickness 115 on the bottom 122 of the heating face 120 of the order of 30 μm, when the protective coating 121 is an enamel-type coating. The use of an enamel-type coating requires firing temperatures in the range of 550° C. to 600° C. Above 500° C., a diffusion phenomenon taking place at the steel/aluminum interface favors the formation of iron/aluminum intermetallic compounds, which displaces the interface between the intermediate layer 113 and the outer layer 112, and reduces the thickness of the outer layer 112.

The thickness of the intermediate layer 113 is usually of the order of 3 to 5 μm, but can be greater in particular in the case of heat treatment favoring the growth of the thickness of the intermediate layer 113, if necessary in the form of several sub-layers, and/or the reduction of the thickness of the external layer 112.

The thickness of the outer layer 112 on the bottom 122 of the heating face 120 is critical to the compatibility of the coated metal cooking medium 100 with induction heating. A thickness of less than 27 μm for the outer layer 112 on the bottom 122 of the heating face 120 is considered a limiting value for achieving coupling on an induction plate. For the outer layer 112 on the bottom 122 of the heating face 120, a thickness of less than 26 μm gives a better result than a thickness of less than 27 μm, a thickness of less than 25 μm gives a better result than a thickness of less than 26 μm, a thickness of less than 24 μm gives a better result than a thickness of less than 25 μm, a thickness of less than 23 μm gives a better result than a thickness of less than 24 μm, a thickness of less than 22 μm gives a better result than a thickness of less than 23 μm, a thickness of less than 21 μm gives a better result than a thickness of less than 22 μm, a thickness of less than 20 μm gives a better result than a thickness of less than 21 μm, a thickness of less than 19 μm gives a better result than a thickness of less than 20 μm, a thickness of less than 18 μm gives a better result than a thickness of less than 19 μm, a thickness of less than 17 μm gives a better result than a thickness of less than 18 μm. A thickness of less than 20 μm for the outer layer 112 on the bottom 122 of the heating face 120 allows a fairly satisfactory coupling with induction plates. A thickness of less than 18 μm for the external layer 112 on the bottom 122 of the heating face 120 allows a very satisfactory coupling with the induction plates. The efficiency (power absorbed by the coated metal cooking surface 100/power emitted by the induction plate) can approach 100%. The heating speed is very fast.

As shown in FIG. 5, the coated metal induction heating compatible cooking rack 100 has an exposed edge 128. The wafer 128 is generally devoid of an outer layer 112 due to the cutting of the metal body 110 to make a shape suitable for making the coated metal baking rack 100. The edge 128 may be at least partially covered by the protective coating 121 and/or anti-adhesive coating 131. Preferably the exposed edge 128 is covered by the protective coating 121 and/or by the anti-adhesive coating 131.

As shown in FIG. 6, the coated metal induction heating compatible cooking surface 100 may have a pinched edge 125. As shown in FIG. 7, the coated metal induction heating compatible cooking rack 100 may have a rolled edge 126. As shown in FIG. 8, the coated metal induction heating compatible cooking rack 100 may have an open rolled edge 127. Thus, the edge 128 does not appear on the top side of the coated metal baking tray 100.

FIG. 9 illustrates a cooking article 140 having the coated metal cooking rack 100 and a gripper 150 mounted on the coated metal cooking rack 100. The coated metal cooking rack 100 forms the cooking vessel 124 shown in FIG. 5. In the example embodiment shown in FIG. 9, the gripper 150 is attached to the cooking vessel 124 by at least one rivet 151. For this purpose, the rivet 151 is mounted in a hole in the side wall 123. If desired, multiple rivets 151 may be used to secure the gripper 150 to the cooking vessel 124. Preferably between two and four rivets 151 are used to secure the gripper 150 to the cooking vessel 124. Alternatively, the gripper 150 could be attached to the sidewall 123 by welding or screwing to a stud welded to the sidewall 123. If desired, a further gripper can be attached to the side wall 123 of the cooking vessel 124 by means of at least one further rivet, by welding or by screwing onto a stud welded to the side wall 123

FIG. 10 illustrates an electric cooking appliance 160 having the coated metal cooking rack 100 associated with an induction heater 170. The coated metal cooking rack 100 forms the cooking vessel 124 shown in FIG. 5. The cooking vessel 124 is arranged in a heating base 175 comprising the induction heater 170. The bottom 122 rests on the induction heater 170. If desired, the cooking vessel 124 may include at least one gripper 155. In the example embodiment shown in FIG. 10 the cooking vessel 124 has two opposing grippers 155. One or each gripper 155 is attached to the cooking vessel 124 by at least one rivet 156. For this purpose the rivet 156 is mounted in a hole in the side wall 123. If desired, multiple rivets 156 may be used to secure the or each gripper 155 to the cooking vessel 124. Preferably between two and four rivets 151 are used to secure the or each gripper 155 to the cooking vessel 124. Alternatively, one or at least one of the grippers 155 could be attached to the sidewall 123 by welding or screwing to a stud welded to the sidewall 123.

The coated metal cooking support 100 compatible with induction heating according to the invention can be obtained by various methods.

A first method of obtaining a coated metal cooking medium 100 compatible with induction heating includes the following steps:
Cutting or supplying a shape from a two-sided aluminized low carbon ferromagnetic steel sheet,
Stamping the form to form the metal body 110 comprising the heating face 120 and the firing face 130,
Production of the protective coating 121 on the heating face 120,
The anti-adhesive coating 131 is applied to the cooking face 130 to form the cooking surface 132.

The shape can be a disk in particular. If desired after drawing the form and before making the protective coating 121 and the anti-adhesive coating 131 the first process may include a step of treating a peripheral portion of the form to obtain a pinched edge 125 or a rolled edge 126 or an open rolled edge 127.

In this first process, the protective coating 121 and the anti-adhesive coating 131 are made after the shaping operation. The range of coatings that can be used is wide. In particular, the protective coating 121 may be a PTFE-type coating, or an enamel-type coating, or a lacquer-type coating, or a ceramic-type coating, or a sol-gel-type coating. In particular, the anti-adhesive coating 131 may be a PTFE type coating, or a ceramic type coating, or a sol-gel type coating.

A second method of obtaining a coated metal cooking medium 100 compatible with induction heating comprises the following steps:
Cutting or supplying a shape from a two-sided aluminized low carbon ferromagnetic steel sheet comprising a first side and a second side,
The protective coating 121 on the first side and the anti-adhesive coating 131 on the second side, to obtain a coated shape,
Stamping the coated form to form the coated metal body 110 comprising the heating face 120 bearing the protective coating 121 and the cooking face 130 bearing the anti-adhesive coating 131 to form the cooking surface 132.

The shape can be a disk in particular. If desired, after the protective coating 121 and the anti-adhesive coating 131 have been applied and after the coated form has been deep drawn, the second process may include a step of treating a peripheral portion of the coated form to obtain a pinched edge 125 or a rolled edge 126 or an open rolled edge 127.

In this second process, the protective coating 121 and the anti-adhesive coating 131 are performed prior to the shaping operation. As a result, the range of coatings that can be used is more limited. The protective coating 121 and the anti-adhesive coating 131 shall allow the shape to be formed by stamping the shape. The protective coating 121 can be a PTFE-type coating or a lacquer-type coating. The anti-adhesive coating 131 may in particular be a PTFE type coating.

The use of a two-sided aluminized low-carbon ferromagnetic steel sheet 101 to make the coated metal baking tray 100 allows the use of a cheaper raw material than the usual aluminum and stainless steel products. The use of a two-sided aluminized low-carbon ferromagnetic steel sheet 101 to make the coated metal baking tray 100 also allows conventional manufacturing processes to be used, limiting the investment required.

The coated metal baking tray 100 is lightweight and very strong mechanically. Deformation during use is much less than with aluminum and stainless steel cookware, due to the absence of a bimetal effect. The efficiency (power input/power output of the induction heater) is very high, especially if the thickness of the aluminum-based deposit 115 is less than 20 μm. The heating speed is high: 15 seconds for a 28 cm diameter pan against about 1 min30 for a standard aluminum pan of the same diameter with a stainless steel insert for compatibility with induction heating.

Various modifications and/or improvements that are obvious for the person skilled in the art can be made to the exemplary embodiments of the invention described in this description without departing from the scope of the invention defined by the appended claims.

The invention claimed is:

1. A coated metal cooking support compatible with induction heating, comprising:
a metal body including a heating face and a cooking face, and
a protective coating;

wherein the heating face has a bottom configured to face an induction heating device, and the protective coating is disposed on the heating face,
wherein the cooking face includes an anti-adhesive coating forming a cooking surface,
wherein the metal body comprises:
a two-sided low-carbon ferromagnetic steel sheet comprising a low-carbon ferromagnetic steel substrate, and
an aluminum-based deposit disposed on each face of the two-sided low-carbon ferromagnetic steel sheet,
wherein the aluminum-based deposit comprises an outer layer comprising an aluminum-based matrix, and an intermediate layer comprising iron/aluminum intermetallic compounds, which comprise $FeAl_3$ or $Fe_2Al_5$,
wherein the intermediate layer is positioned between the ferromagnetic low-carbon steel substrate and the outer layer,
wherein, at least on the bottom outer surface of the heating face, the outer layer has a thickness of less than 27 μm,
wherein the intermediate layer has a thickness of greater than 3 μm to 5 μm, and
wherein the outer layer comprises silicon in an amount of more than 10 wt % to less than or equal to 13 wt %, based on a total weight of the outer layer, and the outer layer comprises Al—Fe—Si needles in an aluminum-silicon matrix.

2. The coated metal cooking support compatible with induction heating according to claim 1, wherein the ferromagnetic low carbon steel substrate has a thickness of between 0.7 and 3 mm.

3. The coated metal cooking support compatible with induction heating according to claim 1, wherein the ferromagnetic low-carbon steel substrate is made of a steel grade having between 0.1 and 0.2 wt. % carbon.

4. The coated metal cooking support compatible with induction heating according to claim 1, wherein the protective coating is made directly on the heating face of the metal body.

5. The coated metal cooking support compatible with induction heating according to claim 1, wherein the protective coating is a PTFE-type coating, an enamel-type coating, a lacquer-type coating, a ceramic-type coating, or a sol-gel-type coating.

6. The coated metal cooking support compatible with induction heating according to claim 5, wherein the protective coating is a PTFE-type coating, a lacquer-type coating, a ceramic-type coating, or a sol-gel-type coating, and the aluminum-based deposit has, at least on the bottom of the heating face, a thickness of less than 30 μm.

7. The coated metal cooking support compatible with induction heating according to claim 6, wherein the protective coating is a coating of the enamel type, and the aluminum-based deposit has, at least on the bottom of the heating face, a thickness of less than 40 μm.

8. The coated metal cooking support compatible with induction heating according to claim 1, wherein the anti-adhesive coating is a PTFE type coating, a ceramic type coating, or a sol-gel type coating.

9. The coated metal cooking support compatible with induction heating according to claim 1, wherein a side wall rises around the bottom of the heating face to form a cooking vessel.

10. The coated metal cooking support compatible with induction heating according to claim 1, wherein it has a pinched edge a rolled edge or an open rolled edge.

11. A culinary article comprising the coated metal cooking support of claim 1, and a gripper coupled to the coated metal cooking support.

12. An electric cooking appliance comprising the coated metal cooking support of claim 1 and an induction heating hearth.

13. A method of obtaining the coated metal cooking support compatible with induction heating according to claim 1, comprising the following steps:
cutting or supplying a shape from a two-sided aluminized low carbon ferromagnetic steel sheet,
stamping the shape to form the metal body comprising the heating face and the cooking face,
forming the protective coating on the heating face-, and
applying the anti-adhesive coating to the cooking face to form the cooking surface.

14. The method of obtaining the coated metal cooking support compatible with induction heating according to claim 13, wherein after the stamping to form the metal body and before the protective coating is formed and the anti-adhesive coating is applied, the process comprises a step of treating a peripheral part of the form in order to obtain a pinched edge a rolled edge or an open rolled edge.

15. The method of obtaining the coated metal cooking support compatible with induction heating according to claim 14, wherein the protective coating is a PTFE-type coating, an enamel-type coating, a lacquer-type coating, a ceramic-type coating, or a sol-gel-type coating.

16. The method of obtaining the coated metal cooking support compatible with induction heating according to claim 14, wherein the anti-adhesive coating is a PTFE type coating, a ceramic type coating, or a sol-gel type coating.

17. A method of obtaining the coated metal cooking support compatible with induction heating according to claim 1, comprising the following steps:
cutting or supplying a shape from a two-sided aluminized low carbon ferromagnetic steel sheet comprising a first side and a second side,
applying a protective coating on the first side and an anti-adhesive coating on the second side, to obtain a coated shape, and
stamping the coated shape to form a coated metal body comprising a heating face bearing the protective coating and a cooking face bearing the anti-adhesive coating to form a cooking surface.

18. The method of obtaining the coated metal cooking support compatible with induction heating according to claim 17, wherein after the protective coating and the anti-adhesive coating have been applied and after the coated form has been stamped, the method comprises a step of treating a peripheral part of the coated form in order to obtain a pinched edge, a rolled edge, or an open rolled edge.

19. The method of obtaining the coated metal cooking support compatible with induction heating according to claim 18, wherein the protective coating is a PTFE-type coating or a lacquer-type coating.

20. The method of obtaining the coated metal cooking support compatible with induction heating according to claim 18, wherein the anti-adhesive coating is a PTFE-type coating.

21. The method of obtaining a coated metal cooking support compatible with induction heating according to claim 14, wherein the shape is a disk.

* * * * *